United States Patent [19]

Hamasaki

[11] Patent Number: 4,762,113
[45] Date of Patent: Aug. 9, 1988

[54] SELF-HEATING CONTAINER

[75] Inventor: Masafumi Hamasaki, Tokorozawa, Japan

[73] Assignees: Chori Company, Ltd., Osaka; Fukubi Kagaku Kogyo Kabushiki Kaishi, Fukui; Hama Corporation Co., Ltd., Saitama, all of Japan

[21] Appl. No.: 78,754

[22] Filed: Jul. 28, 1987

[30] Foreign Application Priority Data

| Aug. 4, 1986 | [JP] | Japan | 61-118819[U] |
| Aug. 4, 1986 | [JP] | Japan | 61-118820[U] |
| Sep. 19, 1986 | [JP] | Japan | 61-142709[U] |
| Oct. 6, 1986 | [JP] | Japan | 61-152443[U] |
| Dec. 22, 1986 | [JP] | Japan | 61-303917 |
| Jan. 29, 1987 | [JP] | Japan | 62-10680[U] |

[51] Int. Cl.⁴ .............................................. F24J 1/00
[52] U.S. Cl. ................................... 126/263; 126/261; 206/222
[58] Field of Search ............... 126/263, 261, 262, 246; 206/219, 222; 44/3.3; 62/4; 426/109, 113, 114

[56] References Cited

U.S. PATENT DOCUMENTS

| 1,971,364 | 8/1934 | Zimmer et al. | 126/263 |
| 4,510,919 | 4/1985 | Benmussa | 126/263 |
| 4,559,921 | 12/1985 | Benmussa | 126/263 |

Primary Examiner—Randall L. Green
Attorney, Agent, or Firm—Wenderoth, Lind & Ponack

[57] ABSTRACT

A self-heating container is capable of generating heat by hydration of an exothermic reaction agent and includes a body, a cover for closing the body, an inner container placed in the body for containing foodstuff to be heated, a primary water bag for supplying water for initial hydration, and an envelope enclosing an exothermic reaction agent and a secondary water bag. The amount of water necessary for hydration of the exothermic reaction agent is divided between the primary and secondary water bags so that water may be supplied in two stages to avoid violent eruption of hot steam due to hydration. In operation, the primary water bag is, after opened, removed from the body to discharge water for the initial hydration of the exothermic reaction agent which generates heat for rupturing the secondary water bag. Then the secondary water bag discharges water for further hydration.

18 Claims, 4 Drawing Sheets

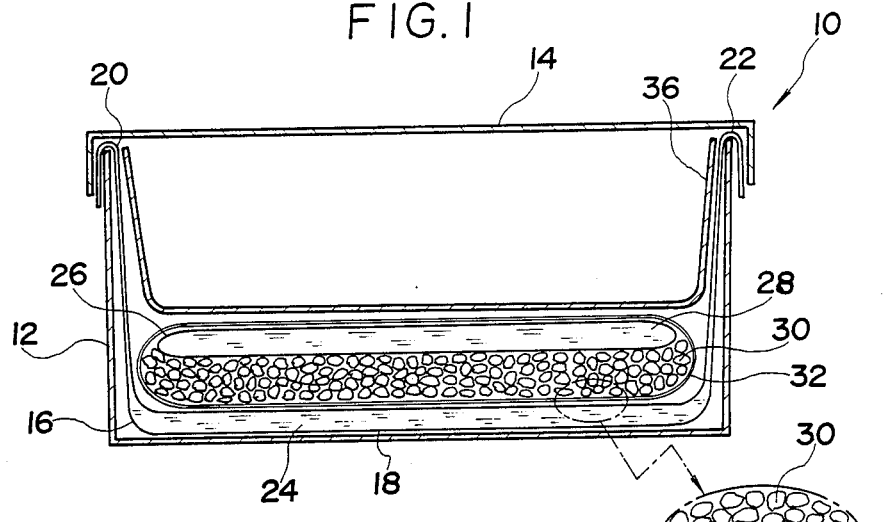
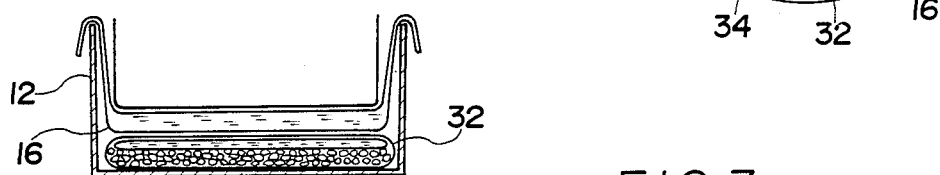
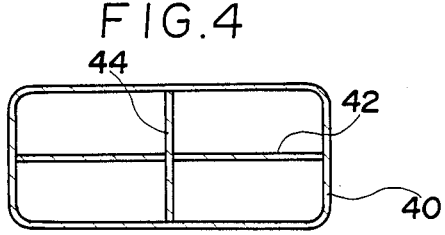
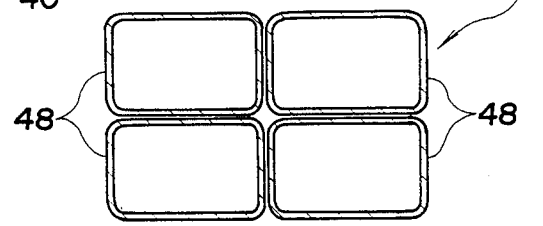

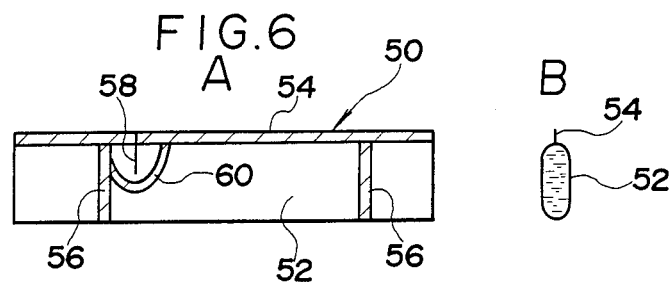
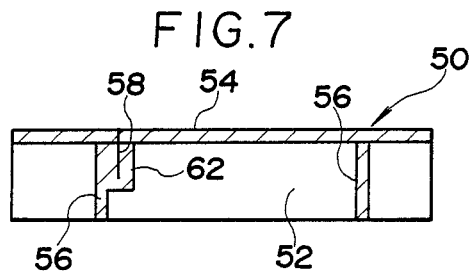
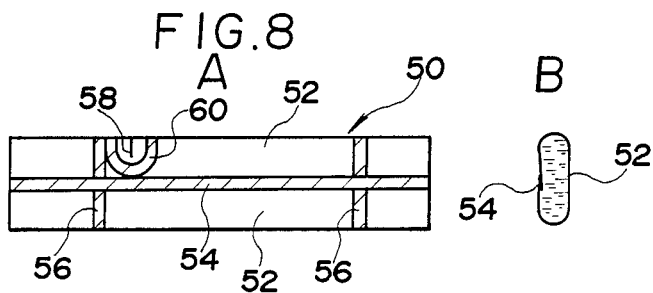
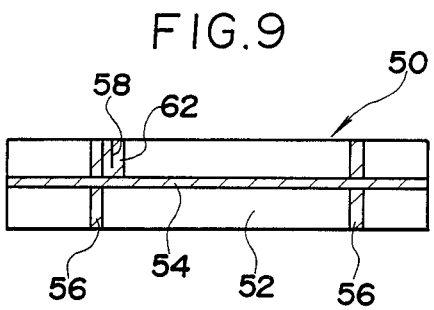

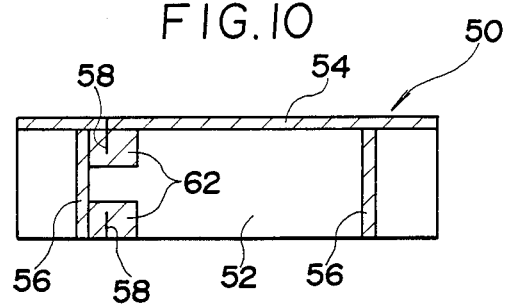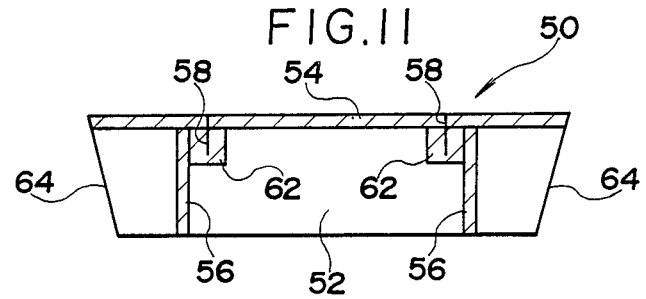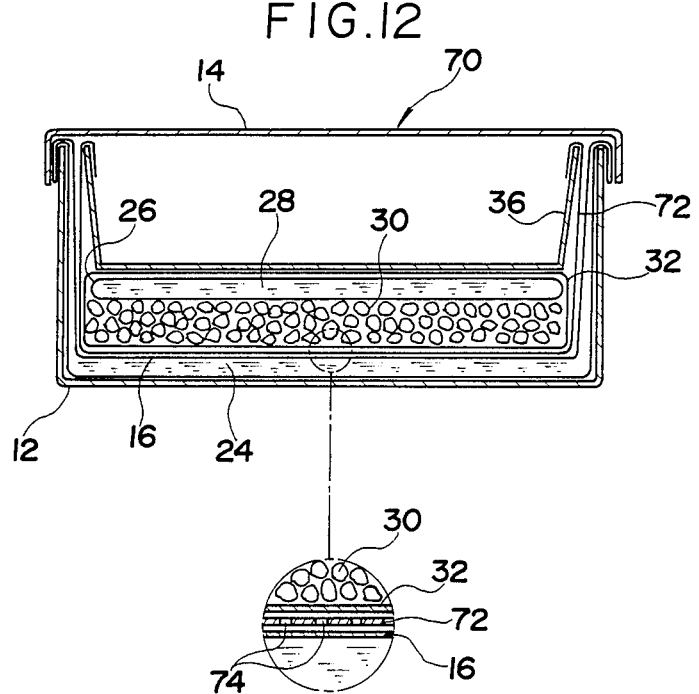

SELF-HEATING CONTAINER

BACKGROUND OF THE INVENTION

1. Field of the Invention

The present invention relates to a self-heating container using an exothermic reaction agent for heating a contained liquid foodstuff such as soup and coffee, or solid and semi-solid foodstuffs such as cooked cereals, vegetables and meat, without a supply of external thermal energy.

2. Description of the Prior Art

Various types of self-heating containers are known for heating contents (mainly foodstuff) by heat of hydration between an exothermic reaction agent such as quicklime and water, as disclosed, for example, in Japanese Patent Publication No. 57-54382. The self-heating container disclosed in this publication includes a foodstuff and an exothermic reaction agent, and has at the top thereof an opening covered with a seal which can be removed when desired so that water can be poured through the opening over the exothermic reaction agent. However, this container involves not only a danger of erupting hot steam from the opening due to hydration but also a disadvantage that water has to be carried along when it is used outdoors.

Another type of a self-heating container is disclosed in U.S. Pat. No. 3,970,068 and includes a bag filled with water for use in the hydration reaction. When in use, the bag is ruptured with a needle member so that water may come out to mix with the exothermic reaction agent. However, the hole bored by the needle member is too small to pass a sufficient amount of water for the initial hydration, so that water does not diffuse completely through the exothermic reaction agent. Therefore, a large part of the exothermic reaction agent tends to remain unreacted, resulting in that foodstuff is not heated to a desirable temperature. Particularly in the case quicklime is used as an exothermic reaction agent, when an amount of water supplied to quicklime per unit time is short at the initial stage of reaction, hydrated lime near the hole absorbs a substantial amount of water discharged through the hole so that only a relatively small amount of quicklime near the hole effects hydration. Accordingly, this container is not suitable particularly for a solid or semi-solid foodstuff which requires a substantial amount of thermal energy of heating.

It is therefore an object of the present invention to provide a self-heating container which enables sufficient hydration between an exothermic reaction agent and water and may generate thermal energy efficiently.

It is another object of the present invention to provide a self-heating container suitable for a solid or semi-solid foodstuff which requires a substantial amount of thermal energy for heating.

It is still another object of the present invention to provide a self-heating container of relatively simple structure which may be produced at a low cost, and yet which is suitable for mass production.

SUMMARY OF THE INVENTION

The self-heating container according to the present invention comprises a body having an upper open end, a cover for closing the body, and an inner container disposed inside the body for containing fooodstuff. Disposed between the bottom of the body and the inner container is an elongated and water-containing primary water bag which has sealed ends held between the upper ends of the body and the cover, and which is capable of being opened and removed from the body to thereby discharge the water into the body. An envelope which is water permeable at least on the side facing the primary water bag is also disposed between the bottom of the body and the inner container. The envelope encloses an exothermic reaction agent which generates heat by hydration, and a secondary water bag rupturable by the heat. The water discharged from the primary water bag causes hydration which generates heat, and the secondary water bag ruptured by the heat to discharge the water for continuing the hydration.

All of the water contained in the primary water bag is discharged at once by opening the primary water bag and removing this from the body. Therefore, hydration can start simultaneously all over the exothermic reaction agent. The water in the secondary bag is supplied to the agent at a delayed timing, which is effective in preventing a dangerous eruption of hot steam such as is involved in the case where the amount of water necessary for hydration of the entire amount of the exothermic reaction agent is supplied at one time.

Preferably, the primary water bag is provided between the sealed ends thereof with at least one notch which extends in a direction perpendicular to the longitudinal direction of the primary water bag, whereby the primary water bag is permitted to rupture at the notch. The notch enables the rupture of the primary water bag with less force, and facilitates the removal thereof after rupture.

According to one embodiment of the present invention, the self-heating container further includes an outer envelope formed of thin sheet material which encloses the envelope and the inner container. This outer envelope is spaced from the wall of the inner container to define a passage for permitting flow of hot steam, and the lower surface of the outer envelope is provided with numerous holes. The outer envelope minimizes loss of the thermal energy generated by hydration and maximizes efficiency of transmission of the thermal energy to the foodstuff.

Other objects, features and advantages of the invention will be apparent from the following detailed description thereof when taken in conjunction with the accompanying drawings.

BRIEF DESCRIPTION OF THE DRAWINGS

FIG. 1 is a sectional view showing schematically an embodiment of a self-heating container according to the present invention;

FIG. 2 is a sectional view showing another arrangement of the primary water bag and the envelope in the self-heating container of FIG. 1;

FIG. 3 is a sectional view showing another example of the envelope;

FIGS. 4 and 5 are plan views showing other examples of the secondary water bag enclosed in the envelope;

FIGS. 6A and 6B are a schematic elevation and cross section, respectively, of the primary water bag with a notch;

FIG. 7 is an elevation showing another example thereof;

FIGS. 8A and 8B are an elevation and a cross section, respectively, showing still another example thereof;

FIGS. 9 through 11 are elevations showing other examples thereof;

FIG. 12 is a sectional view showing another embodiment of the self-heating container according to the present invention.

DETAILED DESCRIPTION OF THE INVENTION

Figure 13:
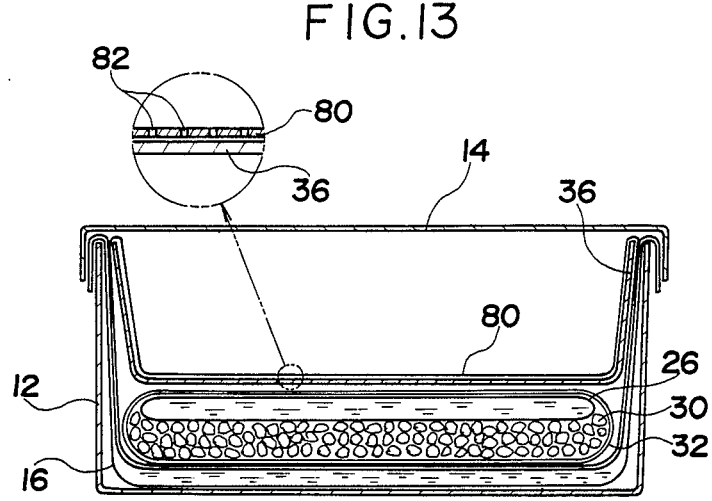
FIGS. 13 and 14 are sectional views showing other embodiments of the self-heating container according to the present invention.

Referring to FIG. 1, a self-heating container according to a first embodiment of the present invention comprises a box-like body 12 with an open upper end and a cover 14 for closing the body 12. These parts are made of heat insulating material such as paper, plastics, glass or ceramics, or of metal combined with a sheet of heat insulating material. Disposed in the body 12 is an elongated band-like primary water bag 16 whose middle portion 18 is placed on the bottom of the body 12. The primary water bag 16 is sealed at both ends 20 and 22 thereof, and is filled with a predetermined amount of water 24. Each end portion of the primary bag 16 extends along the side wall of the body 12 to the open upper end thereof where each sealed end is held between the upper end of the body 12 and the cover 14. The water bag 16 is preferably made of a single thin film or laminated film of synthetic resin such as polyethylene, nylon or polyester, or of laminated material formed by uniting synthetic resin film and aluminum foil. When frictional resistance between the water bag 16 and the bottom of the body is large, it is preferable to dispose spacers or little balls on the bottom in order to eliminate the difficulty in removing the water bag as described below.

Arranged over the middle portion 18 of the water bag 16 is an envelope 32 containing a secondary water bag 26 filled with a predetermined amount of water 28 and an exothermic reaction agent 30. It is necessary that at least the lower surface of the envelope 32 be water permeable. In this embodiment, after the envelope is made of aluminum foil or laminated material formed by uniting aluminum foil and synthetic resin film, numerous holes 34 are bored through at least the lower surface of the envelope 32. If desired, the envelope per se may be made of highly water permeable material such as paper, cloth or unwoven cloth. The secondary water bag 26 in the envelope 32 is made of thin synthetic resin film which can melt by the heat of hydration reaction caused by the water 24 from the primary water bag 16, or of laminated material which is formed by uniting the above mentioned film and aluminum foil so as to be ruptured when the enclosed air is expanded by the heat. The exothermic reaction agent 30 may preferably be in the form of agglomerates or compression moldings of quicklime, from a standpoint of both economy and heat to be generated.

On the envelope 32 is placed an inner container 36 with an open upper end for containing a foodstuff. It is necesary that the inner container 36 be made of heat-resistant and highly heat-conductive material, examples of which are metal foil such as aluminum, metal-synthetic resin laminated material and heat resistant synthetic resin film. In this embodiment the inner container 36 is a simple box, however, it can be partitioned or divided for plural kinds of foodstuff. Desired food, including canned or packaged food, may be received in the inner container 36. In the case of canned food, it is desirable to put in the inner container some water as a heat medium beforehand or when in use.

FIG. 2 shows another example of the above self-heating container in which the positions of the primary water bag 16 and the envelope 32 are reversed; that is, the primary water bag 16 is disposed over the envelope 32 which is placed on the bottom of the body 12. The secondary water bag 26 may be disposed at the center of the envelope 32 so as to be entirely surrounded by the exothermic reaction agent as shown in FIG. 3.

In order to heat the foodstuff contained in the inner container 36, one of the sealed ends 20 and 22 of the primary water bag 16 is torn open with the cover 14 placed over the body 12, and then the water bag 16 is removed from the body 12 by pulling the other end of the water bag 16. Thus, the entire amount of the water 24 in the water bag 16 is instantaneously discharged into the body 12 and enters the envelope 32 through the holes 34 to start hydration. Since the water bag 16 has been taken out, it will not obstruct the water from entering the envelope 32. Then as heat is generated by hydration, the secondary water bag 26 in the envelope 32 is ruptured by the heat so that the water therein is discharged to effect hydration of the exothermic reaction agent 30 which is not yet reacted with the water 24 from the primary water bag 32. The reaction continues until the entire amount of the exothermic reaction agent 30 is hydrated, and the generated heat is transmitted to the foodstuff through the inner container 36 to heat it up to a predetermined temperature.

The amount of water contained in the primary and secondary water bags 16 and 26 is determined so that the entire amount of agent 30 may be reacted, and the amount of thermal energy to be generated can be adjusted by adjusting the amounts of water and exothermic reaction agent. The following are the reasons for the provision of the secondary water bag in addition to the primary water bag. In case of a single water bag, i.e. only the primary water bag, if the amount of water is determined so as to react sufficiently with the exothermic reaction agent 30, violent hydration follows the removal of the water bag with a large amount of hot steam erupting from the container which involves a danger to a human body. On the other hand, if the amount of water is decreased to avoid this, a part of the exothermic reaction agent remains unreacted so that the predetermined amount of thermal energy can not be obtained. Therefore, part of the water necessary for hydration of the entire exothermic reaction agent is alloted to the secondary water bag whereby the water may be discharged in two stages to attain sufficient generation of thermal energy and at the same time the prevention of hot steam eruption.

In FIGS. 4 and 5 are shown other forms of the secondary water bag enclosed in the envelope 32. In FIG. 4, an inner space of a secondary water bag 40 is divided into four equal sections by two intersecting partition seams 42 and 44. The partition seams 42 and 44, for example, may be formed by heat sealing the upper and lower sheets of the secondary water bag 40. On the other hand, a secondary water bag 46 as shown in FIG. 5 comprises four completely separate pouches 48 of equal volume. The advantage of these water bags 40 and 46 is that they can distribute water evenly and reliably all over the exothermic reaction agent 30. In other words, if the water from the primary water bag 16 brings about uneven hydration so that the secondary water bag is partially ruptured, only a part of the water will be discharged from the ruptured points, and as hydration proceeds the rest of the sections or pouches will be ruptured one after another.

In the above embodiment, to rupture the primary water bag 16 the sealed end is torn by hand or a tool such as a knife, but it is preferable to provide a notch between the sealed ends to facilitate the rupture. FIGS. 6 through 11 show several examples of the primary water bag having a notch. The water bag 50 as shown in FIG. 6 is formed by folding a rectangular sheet 52 of synthetic resin such as polyethylene, nylon or polyester in such a manner that its longitudinal edges overlap each other, and then heat sealing the overlapping longitudinal edges at 54. The sheet 52 is also heat sealed at 56 near its ends in the direction perpendicular to the longitudinal seal 54, and water is filled in the space defined by these heat seals 54 and 56. A notch 58 extends across the longitudinal seal 54 between and parallel to the lateral seals 56, and is enclosed by a semi-circular heat seal 60 which prevents water from leaking out through the notch. Water is filled before one of the lateral seals 56 is formed. The notch 58 is preferably positioned such that when the water bag 50 is placed in the body 12 as shown in FIG. 1, the notch 58 is disposed halfway between the corner of the bottom and side walls of the body 12 and the vertical central part of the side wall. Also, the length of the notch 58 is preferably longer than the width of the longitudinal seal 54 and, more preferably, about a third of the width of the water bag 50.

In the water bag of FIG. 7, a seal 62 is formed surrounding the notch 58 and is continuous with the longitudinal seal 54, the notch 58 being formed in the seal 62. The notch 58 need not always extend across the longitudinal seal 54, but may be formed at the transverse end of the water bag when the sheet 52 is folded such that the longitudinal seal 54 extends along the transverse center of the water bag.

The primary water bag 50 is disposed in the body 12 so that the notch 58 extends along the width of the body 12, namely in the direction perpendicular to the paper of FIG. 1. The end of the water bag 50 remote from the notch 58 may be lightly secured to the vicinity of the upper end of the body 12 or the cover 14 by adhesive tape, adhesive agent or the like. In operation, by moving the end of the water bag 50 closer to the notch 58 in the same direction as the notch extends, the water bag 50 is easily ruptured along the notch 58 to discharge the water for starting hydration. Then, the water bag which has been separated into two can be quickly removed from the body 12 by pulling both ends of the water bag.

The number of the notch 58 is not limited to one. In the water bag 50 of FIG. 10, two seals 62 are formed so as to be transversely opposed to each other, and the notches 58 are respectively formed therein. Accordingly, the water bag 50 can be ruptured along the notches by moving the one end of the water bag in either direction with a reduced force. On the other hand, the water bag 50 as shown in FIG. 11 has two notches 58 near the longitudinal ends so that the bag can be easily ruptured by moving either end thereof. Both edges 64 are obliquely cut so as to indicate the moving direction.

FIG. 12 shows another embodiment of the self-heating container 70 according to the present invention, and the same or corresponding components as in the above embodiment are designated by the same reference numerals. In this embodiment, the envelope 32 of water permeable material and enclosing the exothermic reaction agent 30 and the secondary water bag 26 as well as the inner container 36 disposed thereover are enclosed by an outer envelope 72 made of thin sheet material. The outer envelope 72 may be formed of aluminum film, synthetic resin film or laminated film formed by uniting these films, and through its lower surface are bored many holes 74. The upper end of the outer envelope 72 is folded so as to enwrap the upper end of the inner container 36. In operation, when the primary water bag 16 is ruptured, the discharged water first enters the outer envelope 72 through the holes 74, and then the envelope 32 through the lower surface thereof to effect hydration of the exothermic reaction agent 30. As in the first embodiment, when the hydration proceeds the secondary water bag 26 is ruptured to discharge the additional water which hydrates the remaining, unreacted exothermic reaction agent 30. Most of the heat energy thus generated is transmitted to the foodstuff through the wall of the inner container 36, and at the same time a part thereof in the form of hot steam enters the inner container 36 through the passage defined between the outer envelope 72 and the inner container 36 to heat the foodstuff. Accordingly, hardly any heat energy escapes outside so that it can be used to heat the foodstuff efficiently. The outer envelope 72 also insulates the exothermic reaction agent 30 from the external moisture and prevents its deterioration.

Efficiency in utilization of the heat energy will be further improved when the wall of the inner container 36 is completely covered by the outer envelope. FIG. 13 shows such an arrangement in which an outer envelope 80 is folded at the upper ends of the inner container 36 so as to extend downward along the inner walls thereof, and is bent inward at the bottom corners to cover the bottom. The outer envelope 80 is slightly spaced from the inner container 36 to define therebetween a passage through which hot steam flows, and a part of the outer envelope 80 positioned over the bottom of the inner container 36 is provided with numerous small holes 82 for transmitting the thermal energy to the foodstuff. Other structures are substantially the same as the embodiment of FIG. 12.

Figure 14:
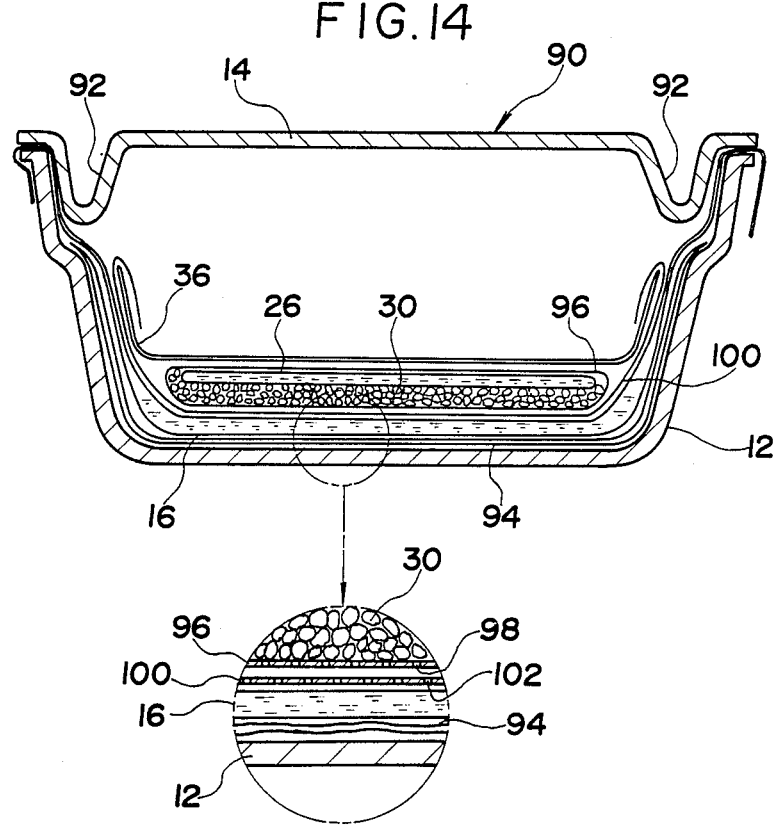

FIG. 14 shows still another embodiment of the self-heating container according to the present invention, and this container 90 is similar to the one as shown in FIG. 12. The cover 14 has concavities 92 which hold the ends of the primary water bag 16 in cooperation with the inner wall of the body 12. A spacer member 94 is disposed between the primary water bag 16 and the body 12 so that the primary water bag 16 may be easily removed. An envelope 96 is made of metal film such as aluminum, or laminated film formed by uniting metal and synthetic resin films, and its lower surface is provided with numerous holes 98. An outer envelope 100 enclosing this envelope 96 and the inner container 36 is made of the same material as the envelope 96, and a part thereof positioned between the primary water bag 16 and the envelope 96 is also provided with numerous holes 102. The holes 98 and 102 are arranged such that they are not aligned with each other. In operation, the primary water bag 16 is ruptured in the manner as described above. The water thus discharged first enters the outer envelope 100 through the holes 102, and then the envelope 96 through the holes 98. During this process, since the holes 98 are not aligned with the holes 102, it takes some time for the water to flow from the outer envelope 100 into the envelope 96, during which time the water diffuses all over the bottom of the body 12. The topical hydration of the exothermic reaction agent 30 can be thus prevented, and hydration can start simultaneously throughout the envelope 96. Further, in a case where quicklime is used as the exothermic reaction agent and changes into powdery substance after hydration, the unaligned holes 98 and 102 can minimize its leakage.

In order to prove the above advantages of the present invention, a few concrete examples will be described below.

EXAMPLE 1

The self-heating container 10 of the same structure as shown in FIG. 1 was prepared with the primary water bag 16 filled with 50 cc of water. 120 g of the quicklime as the exothermic reaction agent 30 and the secondary water bag 26 filled with 30 cc of water were enclosed by the envelope 32 which was placed on the primary water bag 16. In the inner container 36 was contained 250 cc of soup at 5° C. One of the sealed ends of the primary water bag 16 was torn with the cover 14 placed on the body 12, and the other end of the primary water bag 16 was pulled to remove it from the body 12. After 3 minutes the soup was heated to 80.2° C. which was suitable temperature for eating. It rose to 83.2° C., 84.8° C. and 85.0° C. respectively 5, 7 and 10 minutes after the removal of the water bag.

EXAMPLE 2

The same self-heating container 10 as in the Example 1 was prepared, and its inner container accommodated two canned fishes as the foodstuff. 7 minutes after the rupture and removal of the primary water bag 16, the cans were opened for measurement, and the contents were heated to 69.6° C. and 70.2° C., respectively. These temperatures are not at all too low for eating.

EXAMPLE 3

The same self-heating container as in the Example 1 was prepared, except that the four-pouch secondary water bag 46 as shown in FIG. 5 containing a total amount of 30 cc of water was disposed at the center of the envelope 32 as shown in FIG. 3. In the inner container 36 were placed cooked rice and stew with beef and vegetables such as potatoes at room temperature. 5 minutes after the rupture and removal of the primary water bag 16, the stew was heated to 78.8° C. while the cooked rice was heated to 76.6° C.

Although the invention has been described with reference to the preferred embodiments thereof, many modifications and alterations may be made within the spirit of the invention.

What is claimed is:

1. A self-heating container comprising:
   a body having an upper open end;
   a cover for closing said body;
   an inner container disposed in said body for containing foodstuff;
   an elongated primary water bag filled with water and disposed between the bottom of said body and said inner container, said primary water bag having sealed ends held between the upper end of said body and said cover, and said primary water bag capable of being opened and removed from said body to thereby discharge the water into said body; and
   an envelope disposed between said bottom of said body and said inner container and having permeability to water on at least the side facing said primary water bag, said envelope enclosing an exothermic reaction agent for generating heat by hydration and a secondary water bag filled with water, said secondary water bag being rupturable by the heat, whereby hydration caused by water discharged from said primary water bag generates heat to rupture said secondary water bag and continue the hydration.

2. A self-heating container as claimed in claim 1, wherein said primary water bag is disposed between said bottom of said body and said envelope.

3. A self-heating container as claimed in claim 1, wherein said envelope is placed on said bottom of said body, and said primary water bag is disposed between said envelope and said inner container.

4. A self-heating container as claimed in claim 1, wherein space inside said secondary water bag is divided by partitions into plural sections of substantially equal volume.

5. A self-heating container as claimed in claim 1, wherein said secondary water bag consists of plural separate pouches of substantially equal volume.

6. A self-heating container as claimed in claim 1, wherein said primary water bag is opened by tearing one of said sealed ends thereof and is removed from said body by pulling the other end away.

7. A self-heating container as claimed in claim 1, wherein said primary water bag has between said sealed ends thereof at least one notch extending in a direction perpendicular to the longitudinal direction of said primary water bag to thereby permit said primary water bag to be torn open at said notch.

8. A self-heating container as claimed in claim 7, wherein said primary water bag is disposed in said body in such a manner that said notch extends along the width of said body, and is ruptured by moving said sealed end in the same direction as said notch extends.

9. A self-heating container as claimed in claim 7, wherein said primary water bag is formed by rolling a rectangular synthetic resin sheet and heat sealing the longitudinal edges thereof.

10. A self-heating container as claimed in claim 9, wherein said notch extends across and beyond said sealed edges, and a portion of said notch beyond said sealed edges is encircled by a seal for preventing leakage of water.

11. A self-heating container as claimed in claim 9, wherein said notch is formed at a site spaced from said sealed edges and is encircled by a seal for preventing leakage of water.

12. A self-heating container as claimed in claim 8, wherein end faces of said primary water bag are formed obliquely for indicating the moving direction of said sealed end.

13. A self-heating container as claimed in claim 1, further comprising an outer envelope formed of thin sheet material and enclosing said envelope and said inner container, said outer envelope being spaced from the wall of said inner container to define therebetween a passage for permitting flow of hot steam, and the lower surface of said outer envelope being provided with numerous holes.

14. A self-heating container as claimed in claim 13, wherein said outer envelope has an end located on the inner side surface of said inner container.

15. A self-heating container as claimed in claim 13, wherein said outer envelope covers the inner surface of said inner container and has numerous holes for permitting discharge of the hot steam into said inner container.

16. A self-heating container as claimed in claim 13, wherein said envelope is made of water-impermeable material and is provided at the lower surface thereof with numerous holes which are not aligned with said holes of said outer envelope.

17. A self-heating container as claimed in claim 1, wherein said body and said cover are made of heat insulating material.

18. A self-heating container as claimed in claim 1, wherein said exothermic reaction agent comprises quicklime.

* * * * *